United States Patent
Fribus et al.

(10) Patent No.: US 12,077,206 B2
(45) Date of Patent: Sep. 3, 2024

(54) OPERATOR CONTROL DEVICE FOR A VEHICLE, STEERING WHEEL, DASHBOARD, CENTER CONSOLE OR ARMREST FOR A VEHICLE WITH AN OPERATOR CONTROL DEVICE, VEHICLE WITH AN OPERATOR CONTROL DEVICE AND METHOD FOR OPERATING AN OPERATOR CONTROL DEVICE

(71) Applicant: ZF Friedrichshafen AG, Friedrichshafen (DE)

(72) Inventors: Vitali Fribus, Quakenbrück (DE); Lenard Petrzik, Diepholz (DE)

(73) Assignee: SIGNATA GMBH, Diepholz (DE)

( * ) Notice: Subject to any disclaimer, the term of this patent is extended or adjusted under 35 U.S.C. 154(b) by 171 days.

(21) Appl. No.: 17/642,353

(22) PCT Filed: Sep. 9, 2020

(86) PCT No.: PCT/EP2020/075212
§ 371 (c)(1),
(2) Date: Dec. 6, 2022

(87) PCT Pub. No.: WO2021/048213
PCT Pub. Date: Mar. 18, 2021

(65) Prior Publication Data
US 2023/0140082 A1   May 4, 2023

(30) Foreign Application Priority Data

Sep. 11, 2019 (DE) .......................... 102019213858.6

(51) Int. Cl.
*B62D 1/04* (2006.01)
*B60R 16/037* (2006.01)

(52) U.S. Cl.
CPC ............ *B62D 1/046* (2013.01); *B60R 16/037* (2013.01)

(58) Field of Classification Search
CPC ........ B62D 1/046; B60R 16/037; B60K 20/06
(Continued)

(56) References Cited

U.S. PATENT DOCUMENTS

2013/0175132 A1   7/2013   Battlogg et al.

FOREIGN PATENT DOCUMENTS

DE   10 2005 055 307 A1   1/2007
DE   10 2015 110 633 A1   1/2017
(Continued)

OTHER PUBLICATIONS

International Search Report and Written Opinion of the International Search Authority mailed Dec. 7, 2020 in Internation Application No. PCT/EP2020/075212 (English and German languages) (10 pp.).

(Continued)

*Primary Examiner* — T. Scott Fix
(74) *Attorney, Agent, or Firm* — Crowell & Moring LLP (57) ABSTRACT

An operator control device for a vehicle may have a rotatable base body, an electronic unit, and a rotary unit. The rotatable base body may have a first operator control section for setting at least one first vehicle function which is assigned to the first operator control section, and a second operator control section for setting at least one second vehicle function which is assigned to the second operator control section. The electronic unit may be designed to make available a first contact signal which represents manual contact with or approaching of the first operator control section, and a second contact signal which represents
(Continued)

manual contact with or approaching of the second operator control section. The rotary unit may permit a rotational movement of the base body.

19 Claims, 8 Drawing Sheets

(58) Field of Classification Search
USPC .................................................. 74/484 R
See application file for complete search history.

(56) References Cited

FOREIGN PATENT DOCUMENTS

| DE | 10 2017 223 655 A1 | 6/2019 |
| FR | 3 010 547 | 3/2015 |

OTHER PUBLICATIONS

Office Action dated Mar. 11, 2020 for German Patent Application No. 10 2019 213 858.6 (12 pp.), note: pp. 1 and 2 are English language Explanations to Section C. Result of Determination Document.

OPERATOR CONTROL DEVICE FOR A VEHICLE, STEERING WHEEL, DASHBOARD, CENTER CONSOLE OR ARMREST FOR A VEHICLE WITH AN OPERATOR CONTROL DEVICE, VEHICLE WITH AN OPERATOR CONTROL DEVICE AND METHOD FOR OPERATING AN OPERATOR CONTROL DEVICE

RELATED APPLICATION

This application is a filing under 35 U.S.C. § 371 of International Patent Application PCT/EP2020/075212, filed Sep. 9, 2020, and claiming priority to German Patent Application 10 2019 213 858.6, filed Sep. 11, 2019. All applications listed in this paragraph are hereby incorporated by reference in their entireties.

TECHNICAL FIELD

The present approach relates to an operator control apparatus for a vehicle, a steering wheel, dashboard, a center console or armrest for a vehicle having an operator control apparatus, a vehicle having an operator control apparatus and a method for operating an operator control apparatus.

DE 10 2015 110 633 A1 describes a haptic operator control device and a method for operating vehicles.

Against this background, the present approach provides an improved operator control apparatus for a vehicle, a steering wheel, a dashboard, a center console or armrest for a vehicle having an improved operator control apparatus, a vehicle having an improved operator control apparatus and a method for operating an improved operator control apparatus according to the main claims. Advantageous configurations emerge from the subclaims and the description below.

BRIEF DESCRIPTION OF THE DRAWINGS

Exemplary embodiments of the approach presented here are shown in the drawings and explained more thoroughly in the description below. In the drawings.

In the description of preferred exemplary embodiments of the present approach below, identical or similar reference signs are used for the elements that are shown in the various figures and that have a similar effect, a repeat description of these elements being dispensed with.

DETAILED DESCRIPTION

In view of the background discussed above, certain advantages that can be achieved using the approaches presented are that intuitive operator control is made possible for an operator control apparatus, multiple palpable rotation characteristics being different for a user on the basis of the operator control.

An operator control apparatus for a vehicle comprises a rotatable base body, an electronics unit and a rotation unit. The rotatable base body comprises a first operator control section for adjusting at least one first vehicle function of the vehicle, which first vehicle function is associated or associable with the first operator control section, and a second operator control section for adjusting at least one second vehicle function of the vehicle, which second vehicle function is associated or associable with the second operator control section. The electronics unit is designed to provide a first touch signal, which represents a manual touch of the first operator control section or approach toward the first operator control section, and to provide a second touch signal, which represents a manual touch of the second operator control section or approach toward the second operator control section. The rotation unit is designed to allow a rotary movement of the base body, wherein the rotation unit is designed to respond to the first touch signal by adjusting a first rotation characteristic of the rotary movement and to respond to the second touch signal by adjusting a second rotation characteristic of the rotary movement, which is different than the first rotation characteristic.

The vehicle can be a road vehicle, for example an automobile. The operator control apparatus can accordingly also be used in connection with other vehicles, devices or machines. A vehicle function can be a functionality that is adjustable or controllable by a user by using the operator control apparatus. By way of example, a vehicle function can represent a basic functionality of the vehicle, such as gear shifting, or a functionality of an assistance system of the vehicle, such as cruise control. The first vehicle function can be different than the second vehicle function, the rotation characteristics differing when the two different functions are adjusted. As such, a rotation characteristic that is beneficial for adjusting a specific driving function may be associated or associable. The first vehicle function may also be identical to the second vehicle function, however, with only the rotation characteristics differing during adjustment, depending on the operator control section at which rotation takes place. Such an operator control apparatus allows one or more different driving functions to be adjusted, a user of the operator control apparatus experiencing different haptic feedback depending on which driving function is adjusted or where the operator control apparatus is rotated. A rotation characteristic can relate to a rotation resistance, an unlocked rotation angle or a notching palpable to a user during a rotary movement, for example. The first rotation characteristic can produce a greater or lesser resistance perceptible to the user than the second rotation characteristic during the rotary movement, for example.

The base body may be in cylindrical and additionally or alternatively hollow and additionally or alternatively tiltable form. If the base body is of hollow configuration, other components of the operator control apparatus may be accommodated in the base body in a space-saving manner. A tiltable base body allows additional functions, such as operating a turn indicator, depending on the tilt position. According to one embodiment, the first operator control section and the second operator control section may be rigidly connected to one another. This allows a simple one-piece part for the base body, for example in the form of a straight tube. The first operator control section and the second operator control section may be arranged directly beside one another or behind one another, for example in alignment relative to a center axis of the base body. The base body can comprise one or more visual markings in order to visually distinguish between the operator control sections.

The rotation unit can comprise an electrical actuator, in particular an MRF unit, in order to produce the first and additionally or alternatively the second rotation characteristic. Different rotation characteristics can be produced quickly and easily using a magnetorheological fluid (MRF) of the MRF unit.

According to one embodiment, the electronics unit may be arranged in the base body and additionally or alternatively comprise a touch sensor system and additionally or alternatively an approach sensor system designed to sense the manual touch of the first operator control section or manual approach toward the first operator control section in order to provide the first touch signal, and additionally or alternatively to sense the manual touch of the second operator control section or manual approach toward the second operator control section in order to provide the second touch signal. This ensures practical and functional utilization of installation space. The touch and additionally or alternatively approach sensor systems may be part of a touch- and additionally or alternatively approach-sensitive film.

It is furthermore advantageous if the operator control apparatus comprises an association device designed to respond to an association signal by associating a fourth vehicle function with the first operator control section instead of the first vehicle function and additionally or alternatively by associating a fifth vehicle function with the second operator control section instead of the second vehicle function. This allows one and the same operator control apparatus to be used to quickly and easily adjust further vehicle functions. The association signal can be generated by a user as a result of selection of a vehicle function in a selection menu. The association signal can also be generated by the rotary movement on the first or second operator control section designed for operator control of the selection menu, however.

The rotation unit may be designed to use the association signal and the first touch signal to adjust a fourth rotation characteristic of the rotary movement and additionally or alternatively to use the association signal and the second touch signal to adjust a fifth rotation characteristic of the rotary movement. The fourth rotation characteristic can be different than the first and additionally or alternatively the fifth rotation characteristic. Similarly, the fifth rotation characteristic can be different than the second and additionally or alternatively the fourth rotation characteristic. It is thus also possible to adjust suitable further rotation characteristics for the further driving functions.

The rotation unit can comprise a rotation sensor designed to sense the rotary movement and to provide a rotation signal. The operator control apparatus can also comprise a control device designed to use the rotation signal and the first touch signal to output a first control signal for actuating at least the vehicle function associated with the first operator control section or to use the rotation signal and the second touch signal to output a second control signal for actuating at least the vehicle function associated with the second operator control section, wherein the vehicle functions can comprise at least one gear, driving experience level, comfort level, infotainment setting, lights setting or menu setting.

According to a further advantageous embodiment, the base body can comprise at least one third operator control section for adjusting at least one third vehicle function of the vehicle, which third vehicle function is associated or associable with the third operator control section, wherein the electronics unit may be designed to provide a third touch signal that represents a manual touch of the third operator control section or approach toward the third operator control section, wherein the rotation device is designed to respond to the third touch signal by adjusting a third rotation characteristic of the rotary movement, which is different than the first rotation characteristic and additionally or alternatively the second rotation characteristic. The operator control apparatus can thus be used to adjust three driving functions.

A steering wheel, a dashboard, a center console or an armrest for a vehicle comprises an operator control apparatus that is formed in one of the variants described above. The aforementioned vehicle components are suitable for accommodating an operator control apparatus that is meant to be able to be used intuitively, for example during a journey with the vehicle.

A vehicle comprises an operator control apparatus that is formed in one of the variants described above. The operator control apparatus means that arbitrary vehicle functions can be adjusted intuitively by a user in such a vehicle.

A method for operating an operator control apparatus comprises the following steps:

reading in a first touch signal, which represents a manual touch of the first operator control section or approach toward the first operator control section of the operator control apparatus, or a second touch signal, which represents a manual touch of the second operator control section or approach toward the second operator control section of the operator control apparatus; and adjusting the first rotation characteristic using the first touch signal or the second rotation characteristic, which is different than the first rotation characteristic, using the second touch signal.

This method may be implemented for example in software or hardware or in a hybrid form comprising software and hardware, for example in a control unit.

Figure 1:
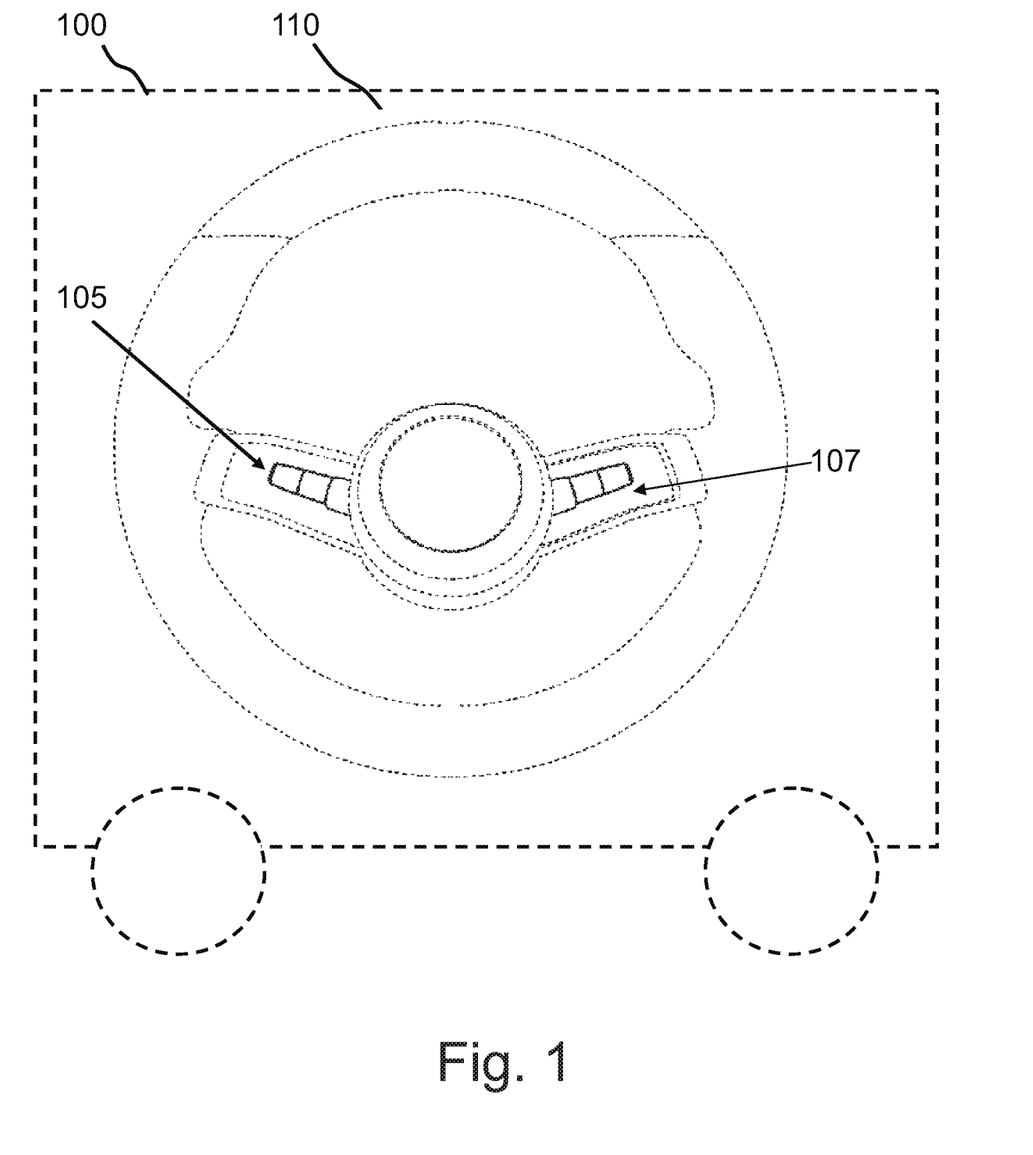
FIG. 1 shows a schematic representation of a vehicle with an operator control apparatus according to an exemplary embodiment FIGS. 2 to 9 each show a schematic representation of an operator control apparatus according to an exemplary embodiment.

Referring now to the figures, FIG. 1 shows a schematic representation of a vehicle 100 with an operator control apparatus 105 according to an exemplary embodiment.

Merely by way of illustration, the operator control apparatus 105 according to this exemplary embodiment is arranged on a steering wheel 110 of the vehicle 100. According to an alternative exemplary embodiment, the operator control apparatus 105 is arranged or arrangeable on a dashboard, a center console or an armrest of the vehicle 100. According to this exemplary embodiment, the steering wheel 110 also has a further operator control apparatus 107. According to this exemplary embodiment, the operator control apparatuses 105, 107 are in cylindrical or bar-shaped form and each extend away from a central area of the steering wheel 110, in opposite directions.

According to this exemplary embodiment, the operator control apparatuses 105, 107 allow a driver of the vehicle 100 to adjust vehicle functions of the vehicle 100. The vehicle functions adjustable using the operator control apparatuses 105, 107 may be firmly predefined or variable in this case. The operator control apparatuses 105, 107 can be used as a substitute for or in addition to conventional switching elements in the vehicle 100.

Figure 2:
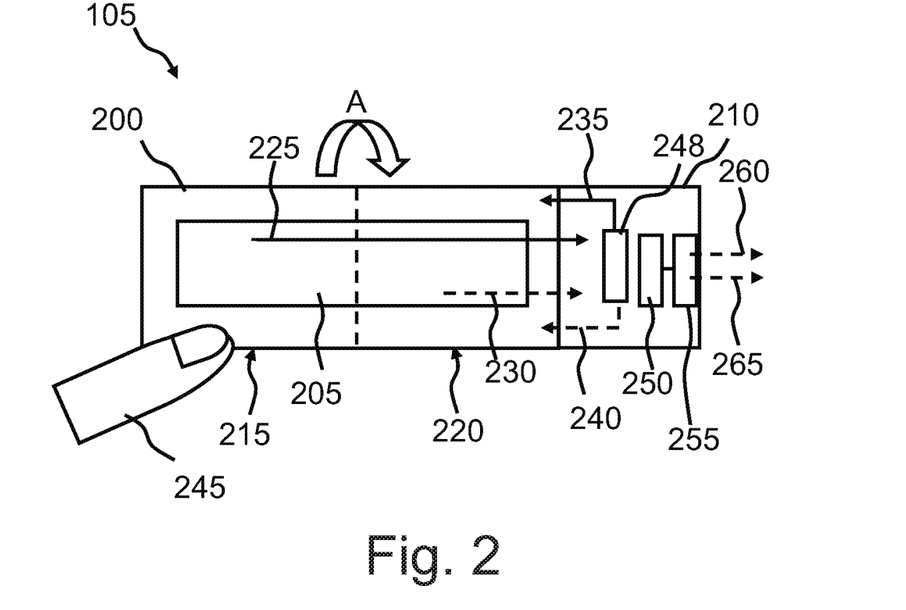

FIG. 2 shows a schematic representation of an operator control apparatus 105 according to an exemplary embodiment. This can be the operator control apparatus 105 described in FIG. 1.

The operator control apparatus 105 comprises a rotatable base body 200, an electronics unit 205 and a rotation unit 210. The rotatable base body 200 comprises a first operator control section 215 for adjusting at least one first vehicle function of the vehicle, which first vehicle function is associated or associable with the first operator control section 215, and a second operator control section 220 for adjusting at least one second vehicle function of the vehicle, which second vehicle function is associated or associable with the second operator control section 220. The electronics unit 205 is designed to provide a first touch signal 225, which represents a manual touch of the first operator control section 215 or approach toward the first operator control section 215, and to provide a second touch signal 230, which represents a manual touch of the second operator control section 220 or approach toward the second operator control section 220. To detect a corresponding touch or approach, a suitable sensor system, for example a capacitive sensor system, which may be part of the electronics unit 205 or may be coupled to the electronics unit 205, is used according to one exemplary embodiment.

The rotation unit 210 is designed to allow a rotary movement A of the base body 200. The rotation unit 210 is therefore a bearing for the base body 200 or a shaft or axle coupled to the base body 200. The rotation unit 210 is designed to respond to the first touch signal 225 by adjusting a first rotation characteristic 235 of the rotary movement A and to respond to the second touch signal 230 by adjusting a second rotation characteristic 240 of the rotary movement A, which is different than the first rotation characteristic 235.

According to this exemplary embodiment, the electronics unit 205 provides the first touch signal 225, because a user of the operator control apparatus 105 approaches or touches the first operator control section 215 with his finger 245. The rotation unit 210 reads in the first touch signal 225 and responds to the first touch signal 225 by adjusting the first rotation characteristic 235 of the rotary movement A of the base body 200. According to an alternative exemplary embodiment, the electronics unit 205 provides the second touch signal 230 when the user of the operator control apparatus 105 approaches or touches the second operator control section 220 with his finger 245. According to the alternative exemplary embodiment, the rotation unit 210 then reads in the second touch signal 230 and responds to the second touch signal 230 by adjusting the second rotation characteristic 240 of the rotary movement A of the base body 200, which is different than the first rotation characteristic 235.

The base body 200 is in cylindrical and/or hollow form according to this exemplary embodiment. At least part of the electronics unit 205 is arranged so as to be accommodated in the base body 200 according to this exemplary embodiment. Further, the electronics unit 205 according to this exemplary embodiment has a touch sensor system and/or an approach sensor system designed to sense the manual touch of the first operator control section 215 or manual approach toward the first operator control section 215 and to respond thereto by providing the first touch signal 225, and/or to sense the manual touch of the second operator control section 220 or manual approach toward the second operator control section 220 and to respond thereto by providing the second touch signal 230.

The first operator control section 215 and the second operator control section 220 are rigidly connected to one another and/or arranged beside one another, that is to say adjacent to one another, according to this exemplary embodiment. The operator control sections 215, 220 are therefore subregions of one and the same base body 200. If the first operator control section 215 carries out the rotary movement A, the second operator control section 220 accordingly rotates as well, and vice versa. The two operator control sections 215, 220 are shown merely by way of illustration; three or more operator control sections can also be realized, which can be embodied as further subregions of the base body 200. According to different exemplary embodiments, a spatial split of the operator control sections 215, 220 on the base body 200 is firmly predefined or variable. By way of example, a dividing line between the operator control sections 215, 220 may be movable. To this end, the dividing line can be displayed using a light-emitting device.

The rotation unit 210 comprises an electrical actuator 248, in particular an MRF unit, in order to produce the first rotation characteristic 235 and/or the second rotation characteristic 240, according to this exemplary embodiment. According to one exemplary embodiment, the touch signals 225, 230 are control signals for actuating the actuator 248. According to an alternative exemplary embodiment, the rotation unit 210 is designed to use the touch signals 225, 230 to provide control signals for actuating the actuator 248. The actuator 248 is designed to influence the rotary movement A of the base body 200, for example to decelerate it, to limit it or to apply a pattern of movement to it that conveys for example the feel of a notching to the user. By way of example, the actuator 248 is designed to respond to the first touch signal 225 by exerting a first force on the base body 200, for example a first deceleration force on a shaft of the base body 200 that is supported by the rotation unit 210, and to respond to the second touch signal 225 by exerting a second force on the base body 200, for example a second deceleration force on the shaft of the base body 200 that is supported by the rotation unit 210, the first force and the second force being different than one another in terms of magnitude, for example.

The rotation unit 210 additionally comprises a rotation sensor 250 designed to sense the rotary movement A and to provide a rotation signal, according to this exemplary embodiment. The operator control apparatus 105 also comprises a control device 255 designed to use the rotation signal and the first touch signal 225 to output a first control signal 260 for actuating at least the vehicle function associated with the first operator control section 215 and/or to use the rotation signal and the second touch signal 230 to output a second control signal 265 for actuating at least the vehicle function associated with the second operator control section 220, wherein the vehicle functions comprise at least one gear, driving experience level, comfort level, infotainment setting, lights setting or menu setting.

The operator control apparatus 105 presented here realizes a haptic operator control element having variable haptics, which operator control element can be used to allow intuitive operator control of multiple different functions, in particular driving, comfort and infotainment functions in the vehicle.

The haptic operator control apparatus 105 consists of the base body 200, the rotation unit 210 and the electronics unit 205. An axle of the rotation unit 210 is coupled directly or via a transmission to the electrical actuator, according to this exemplary embodiment an MRF actuator. The actuator can be used to produce different latching angles, latching forces and/or end stops for the rotation characteristics 235, 240. Furthermore, the axle of the rotation unit 210 is embodied as a hollow shaft according to this exemplary embodiment, with the result that, according to this exemplary embodiment, the inside of the hollow shaft incorporates a fixed support on which the flexible or rigid electronics unit 205 is mounted with a touch and/or approach sensor system and/or with light components. The touch and/or approach sensor system is a capacitive sensor system according to this exemplary embodiment. The base body 200 is characterized in that it is divided in the axial direction by at least two or more functional sections, in the form of the first operator control section 215 and the second operator control section 220 here. According to this exemplary embodiment, a surface of the base body 200 is closed or else divided into individual visible subareas by partial screening, for example. According to one exemplary embodiment, the operator control sections 215, 220 are emphasized or are delimited from one another in a tactile manner, for example by one or more cambers, and/or visually, for example by one or more strips of light and/or painted symbols, in order to allow intuitive control. Each operator control section 215, 220 of the base body 200 may be or is able to be assigned to a unique function that is allocated in a fixed manner or in a user-specific manner beforehand. Alternatively, it is also possible for the section functions to be designed to be dynamic, e.g. menu-dependent, however. To this end, the operator control apparatus 105 according to one exemplary embodiment has an association device designed to respond to an association signal by associating a fourth vehicle function with the first operator control section 215 instead of the first vehicle function and/or by associating a fifth vehicle function with the second operator control section 220 instead of the second vehicle function. According to one exemplary embodiment, the rotation unit 210 is designed to use the association signal and the first touch signal 225 to adjust a fourth rotation characteristic of the rotary movement A and/or to use the association signal and the second touch signal 220 to adjust a fifth rotation characteristic of the rotary movement A. Each function and/or each operator control section 215, 220 of the base body 200 has individual haptics. The respective operator control section 215, 220 is sensed by means of the touch and/or approach sensor system of the integrated electronics unit 205. Manual actuation of the haptic operator control apparatus 105 therefore results first in the operator control section 215, 220 on which the hand or the finger 245 is situated being detected and then in the haptics allocated to the operator control section 215, 220 and/or to the section function being adjusted.

According to one exemplary embodiment, the operator control apparatus 105 presented here comprises an extension with further interaction options such as e.g. tilt, push, slide and/or touch, e.g. swipe gestures, and/or tap. According to one exemplary embodiment, the operator control apparatus 105 presented here comprises an extension with other operator control devices, e.g. mechanical pushbutton switches and/or levers. According to one exemplary embodiment, the operator control apparatus 105 presented here comprises an extension with display apparatuses, e.g. a display and/or symbol lights. According to one exemplary embodiment, the operator control apparatus 105 presented here comprises a combination with other display apparatuses, e.g. a driver display, a center console display, "CID" for short, and/or a head-up display unit, "HUD" for short. According to one exemplary embodiment, the operator control apparatus 105 presented here comprises a combination with sound input apparatuses and/or sound output apparatuses, e.g. audible confirmation of interactions, voice inputs and/or voice output as confirmation or preselection. According to one exemplary embodiment, the operator control apparatus 105 presented here comprises a combination with other input apparatuses such as keys, levers and/or touchpads.

Figure 3:
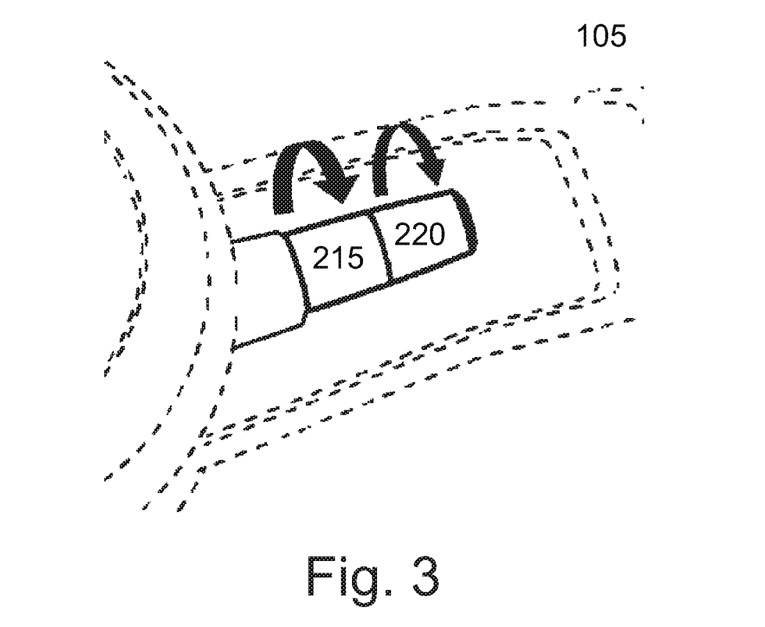

FIG. 3 shows a schematic representation of an operator control apparatus 105 according to an exemplary embodiment. This can be the operator control apparatus 105 described in FIG. 1 or 2. As described in FIG. 1, the operator control apparatus 105 according to this exemplary embodiment is arranged on the steering wheel and is shown in a close-up view.

According to this exemplary embodiment, the operator control apparatus 105 is in the form of a thumb barrel with variable function assignment for operation with one thumb.

According to this exemplary embodiment, the first operator control section 215 is arranged on a left-hand region of the thumb barrel, that is to say closer to the central region of the steering wheel than the second operator control section 220. According to this exemplary embodiment, the operator control apparatus 105 responds to the first touch signal by adjusting the first rotation characteristic, which represents coarse haptics of the first operator control section 215. According to this exemplary embodiment, operating the first operator control section 215, that is to say making the rotary movement at the first operator control section 215, allows a menu change to be made in a main menu as the first vehicle function.

According to this exemplary embodiment, the second operator control section 220 is arranged on a right-hand region of the thumb barrel. According to this exemplary embodiment, the operator control apparatus 105 responds to the second touch signal by adjusting the second rotation characteristic, which represents smooth haptics of the second operator control section 220. According to this exemplary embodiment, operating the second operator control section 220, that is to say making the rotary movement at the second operator control section 220, allows "larger" and/or "smaller" scaling to be carried out in a menu-dependent manner and/or on the basis of a direction of rotation of the rotary movement as the second vehicle function.

Figure 4:
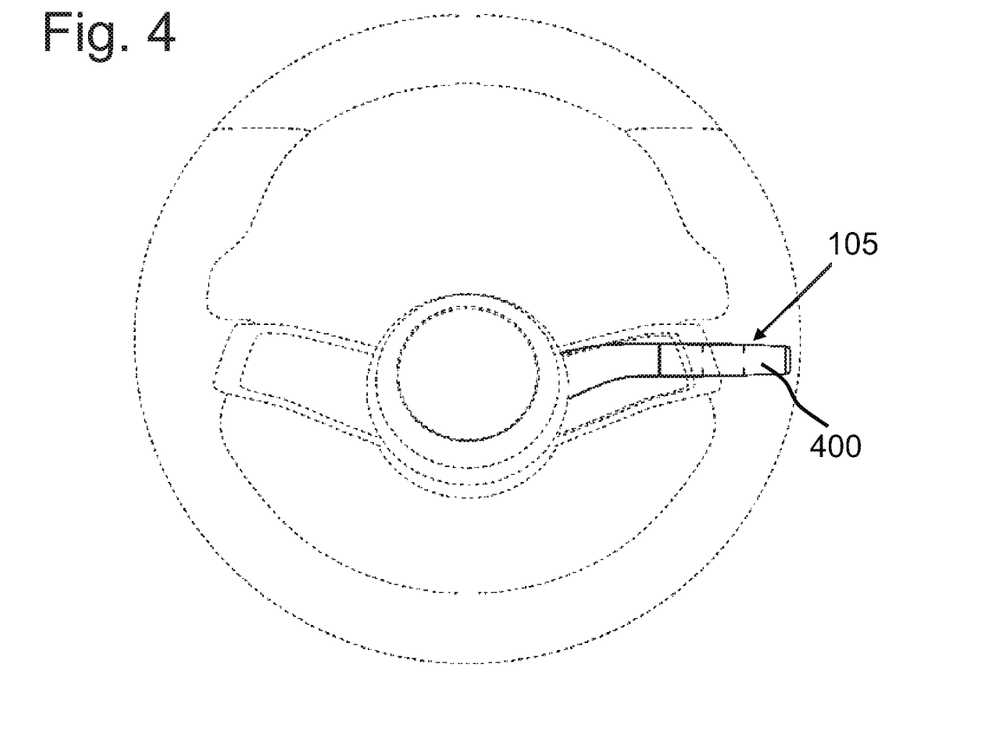

FIG. 4 shows a schematic representation of an operator control apparatus 105 according to an exemplary embodiment. This can be one of the operator control apparatuses 105 described on the basis of one of the preceding figures, with the difference that the operator control apparatus 105 according to this exemplary embodiment comprises a third operator control section 400. At least the base body 200 is optionally in tiltable form. As described in FIG. 1, the operator control apparatus 105 according to this exemplary embodiment is arranged on the steering wheel, from which only one operator control apparatus 105 extends according to this exemplary embodiment.

According to this exemplary embodiment, the base body 200 comprises the third operator control section 400 for adjusting at least one third vehicle function of the vehicle, which third vehicle function is associated or associable with the third operator control section 400, wherein the electronics unit is designed to provide a third touch signal that represents a manual touch of the third operator control section 400 or approach toward the third operator control section, wherein the rotation device is designed to respond to the third touch signal by adjusting a third rotation characteristic of the rotary movement, which is different than the first rotation characteristic and/or the second rotation characteristic.

According to this exemplary embodiment, the operator control apparatus 105 is in the form of a tilting lever with fixed function assignment and/or variable function assignment. A close-up view of the operator control apparatus 105 described here is shown in FIG. 5.

Figure 5:
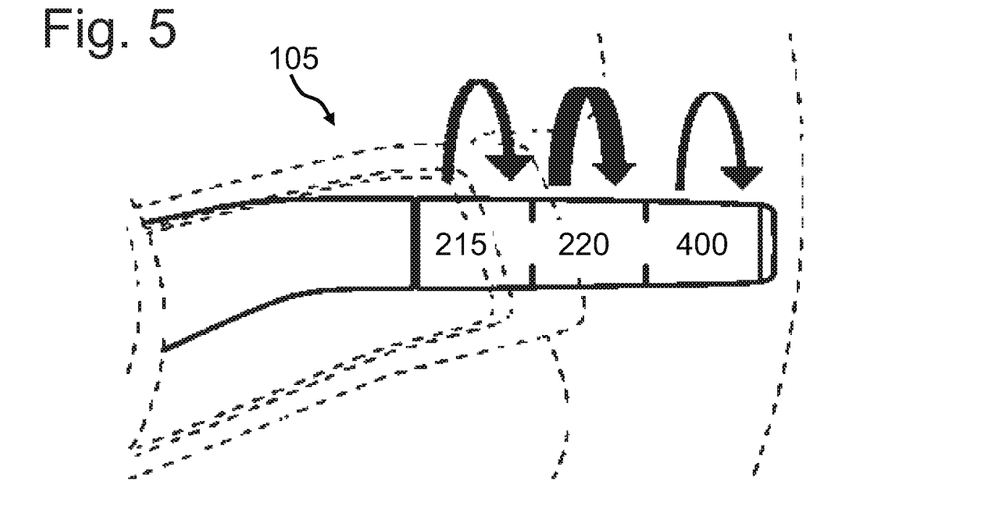

FIG. 5 shows a schematic representation of an operator control apparatus 105 according to an exemplary embodiment. This can be the operator control apparatus 105 described in FIG. 4 in a close-up view.

According to a first exemplary embodiment, the operator control apparatus 105 is in the form of a tilting lever with fixed function assignment. According to this first exemplary embodiment, the operator control apparatus 105 responds to the first touch signal by adjusting the first rotation characteristic, which represents coarse haptics of the first operator control section 215 with fixed notches. According to this first exemplary embodiment, operating the first operator control section 215 allows a gear selector switch having the gears P, R, N and D to be operated as the first vehicle function. According to the first exemplary embodiment, the second operator control section 220 is arranged on a central region of the thumb barrel. According to the first exemplary embodiment, the operator control apparatus 105 responds to the second touch signal by adjusting the second rotation characteristic, which represents coarse haptics of the second operator control section 220. According to the first exemplary embodiment, operating the second operator control section 220 allows a driving experience switch having the levels "Eco", "Comfort" and/or "Sport" to be operated as the second vehicle function. According to the first exemplary embodiment, the third operator control section 400 is arranged on a right-hand region of the thumb barrel. According to this first exemplary embodiment, the operator control apparatus 105 responds to the third touch signal by adjusting the third rotation characteristic, which represents light haptics of the third operator control section 400. According to this first exemplary embodiment, operating the third operator control section 400 allows a lighting change with the settings "Sidelights", "Auto", "Daytime running lights" and/or "Fog" to be operated as the third vehicle function.

According to a second exemplary embodiment, the operator control apparatus 105 is in the form of a tilting lever with a fixed function assignment and a variable function assignment. According to the second exemplary embodiment, the operator control apparatus 105 responds to the first touch signal by adjusting the first rotation characteristic, which represents coarse haptics of the first operator control section 215 with fixed notches. According to this second exemplary embodiment, operating the first operator control section 215 allows a gear selector switch having the gears P, R, N and D to be operated as the first vehicle function. According to the second exemplary embodiment, the operator control apparatus 105 responds to the second touch signal by adjusting the second rotation characteristic, which represents coarse haptics of the second operator control section 220. According to this second exemplary embodiment, operating the second operator control section 220 allows a menu selection from a driving experience switch, "FES" for short, lights and/or a distance controller "Distance Control" to be made as the second vehicle function. According to the second exemplary embodiment, the third operator control section 400 comprises variable functions. According to the second exemplary embodiment, the operator control apparatus 105 responds to the third touch signal by adjusting the third rotation characteristic, which represents changing haptics of the third operator control section 400. According to this exemplary embodiment, operating the third operator control section 400 allows scaling to be performed in the menus, for example scaling of the "FES", in a menu-dependent manner as the third vehicle function.

Figure 6:
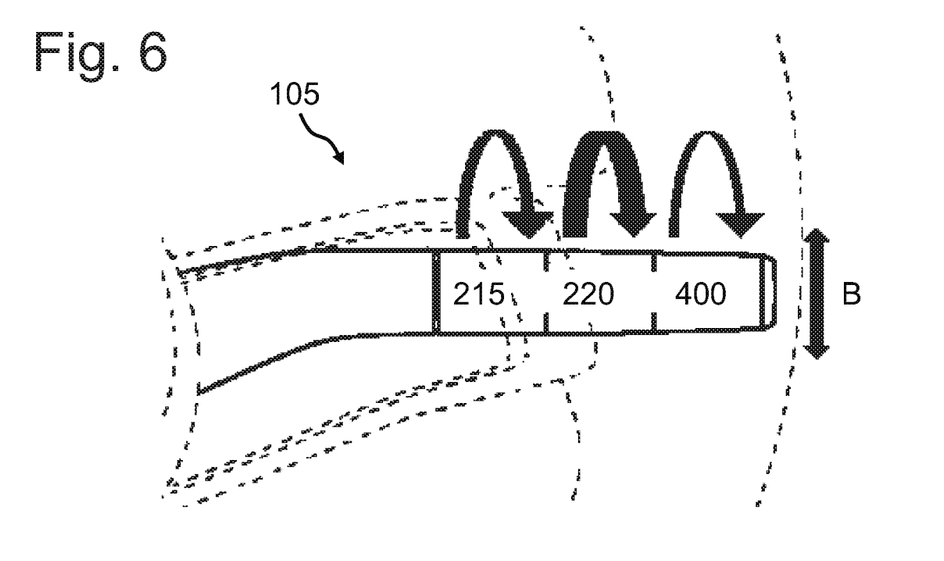

FIG. 6 shows a schematic representation of an operator control apparatus 105 according to an exemplary embodiment. This can be the operator control apparatus 105 with fixed function assignment described in FIG. 5. According to this exemplary embodiment, the operator control apparatus 105 is additionally designed to respond to a tilt movement B of the thumb barrel by outputting a turn indicator signal, which activates a left turn indicator or a right turn indicator of the vehicle depending on the upward or downward tilt movement.

Figure 7:
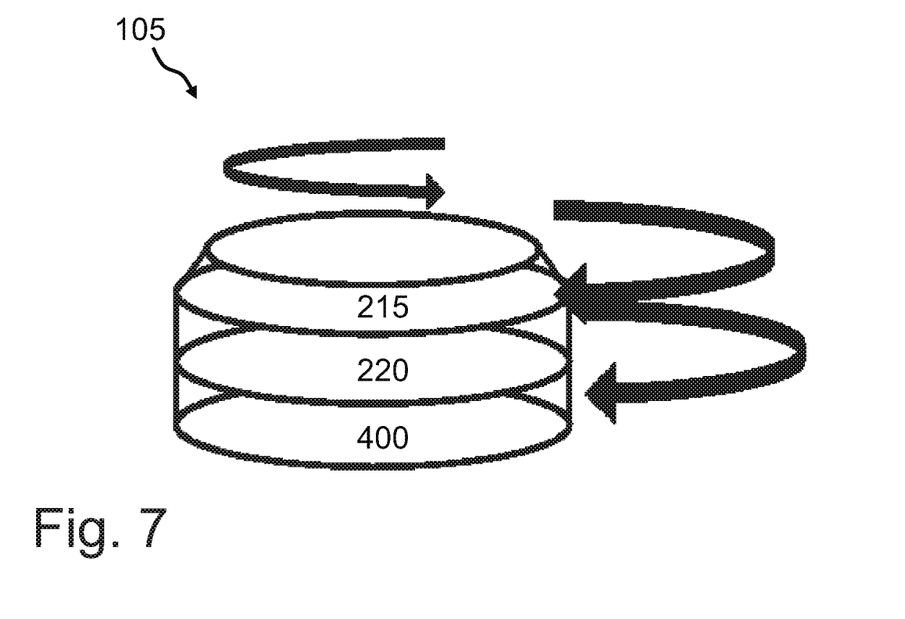

FIG. 7 shows a schematic representation of an operator control apparatus 105 according to an exemplary embodiment. This can be one of the operator control apparatuses 105 described on the basis of one of the preceding figures, with the difference that the operator control apparatus 105 according to this exemplary embodiment is in the form of a rotary control.

Merely by way of illustration, the rotary control according to this exemplary embodiment has three operator control sections 215, 220, 400; according to an alternative exemplary embodiment, the rotary control has just two of the operator control sections 215, 220, 400 or more operator control sections. The operator control sections 215, 220, 400 are arranged in a manner stacked above one another according to this exemplary embodiment.

According to this exemplary embodiment, haptics of the rotary control vary according to the operator control sections 215, 220, 400, also called regions, at which said rotary control is operated. If the rotary control is operated further up, that is to say by way of illustration at the first operator control section 215 here, it reproduces light haptics and permits scaling of the respective submenu. If the rotary control is operated further down, by way of illustration at the second operator control section 220 and/or the third operator control section 400 here, it reproduces coarse haptics and permits control of the menu. Such a rotary control is integrated or integrable in different regions, according to one exemplary embodiment in a center console, an armrest and/or a steering wheel for a vehicle.

Figure 8:
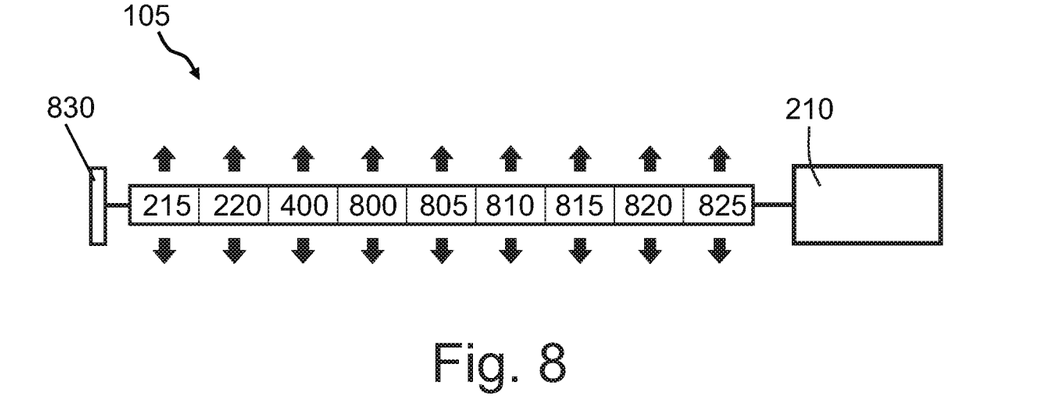

FIG. 8 shows a schematic representation of an operator control apparatus 105 according to an exemplary embodiment. This can be one of the operator control apparatuses 105 described on the basis of one of FIGS. 1 to 6, with the difference that the operator control apparatus 105 according to this exemplary embodiment comprises further operator control sections 800, 805, 810, 815, 820, 825.

According to this exemplary embodiment, the operator control apparatus 105 comprises a fourth operator control section 800, a fifth operator control section 805, a sixth operator control section 810, a seventh operator control section 815, an eighth operator control section 820 and/or a ninth operator control section 825, which are arranged beside one another adjoining the third operator control section 400. The ninth operator control section 825 is arranged adjacent to the rotation device 210 according to this exemplary embodiment.

According to this exemplary embodiment, the operator control apparatus 105 realizes a barrel scheme, in which various functions are haptically separated from one another. According to this exemplary embodiment, the rotation device 210 comprises an MRF unit, which can also be referred to as an "MRF module". The barrel scheme describes a physically continuous barrel that is divided by mechanical delimitation and can therefore reflect the various functions. According to one exemplary embodiment, the barrel scheme is integrable or integrated in a center console and/or a dashboard, for example for a vehicle.

According to one exemplary embodiment, operating the first operator control section 215 allows a seat heating system to be adjusted. According to one exemplary embodiment, operating the second operator control section 220 allows a temperature to be adjusted. According to one exemplary embodiment, operating the third operator control section 400 allows an audio volume to be adjusted. According to one exemplary embodiment, operating the fourth operator control section 800 allows a seat setting to be adjusted. According to one exemplary embodiment, operating the fifth operator control section 805 allows a ventilation to be adjusted.

According to one exemplary embodiment, a first end of the base body of the operator control apparatus 105 is accommodated in a manner supported by the rotation device 210, and a second end opposite the first end is accommodated in a manner supported by a retaining element 830. In this way, even long base bodies comprising a multiplicity of operator control sections 215, 220, 400, 800, 805, 810, 815, 820, 825 can be supported robustly.

Figure 9:
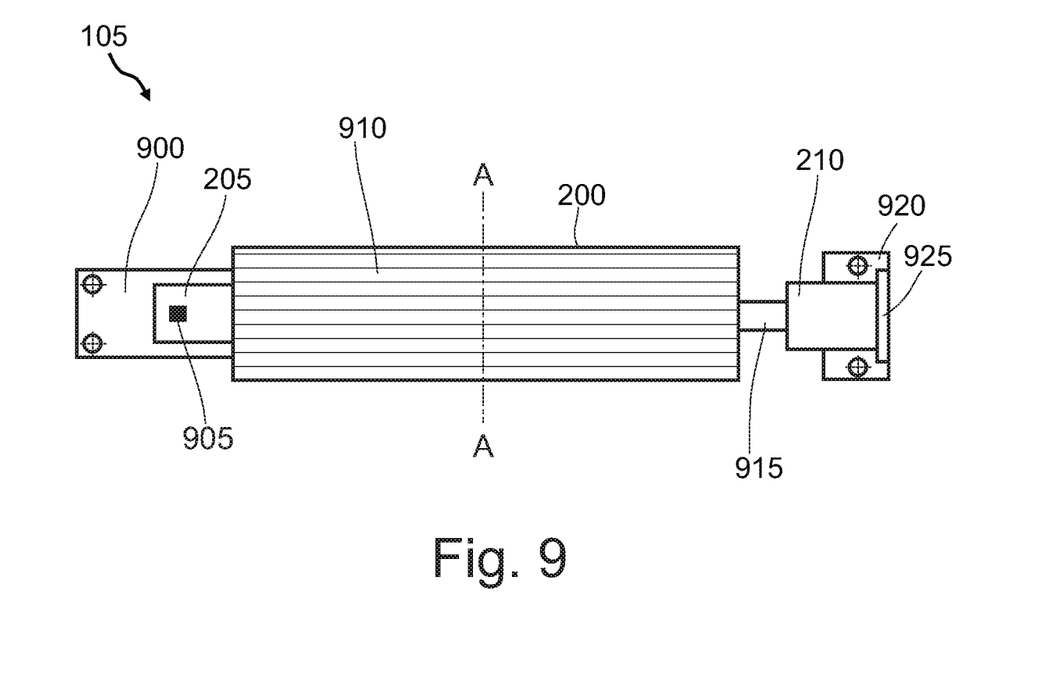

FIG. 9 shows a schematic representation of an operator control apparatus 105 according to an exemplary embodiment. This can be one of the operator control apparatuses 105 described on the basis of one of FIG. 1 to 6 or 8. According to this exemplary embodiment, the operator control apparatus 105 comprises a support 900 for the electronics unit 205, a vehicle connector 905, a film 910 for a touch and/or approach sensor system, a base body support 915, an actuator bracket 920 and an actuator controller 925.

The support 900 is coupled to the electronics unit 205 and extends into the base body 200, the support 900 according to this exemplary embodiment protruding from the base body on an end of the base body 200 that is opposite the rotation unit 210. According to this exemplary embodiment, the electronics unit 205 accommodated in the base body 200 also protrudes at the end. According to this exemplary embodiment, the vehicle connector 905 is arranged outside the base body 200 on the electronics unit 205. According to this exemplary embodiment, the film 910 is in transparent and/or touch- and/or approach-sensitive form. At least part of the film 910 extends inside the base body 200 around the electronics unit 205 and/or the support 900. According to this exemplary embodiment, the rotation unit 219 comprises the electrical actuator, which is designed to produce the variable haptics of the base body. The actuator is mechanically coupled to the actuator bracket 920 and electrically coupled to the actuator controller 925.

Figure 10:
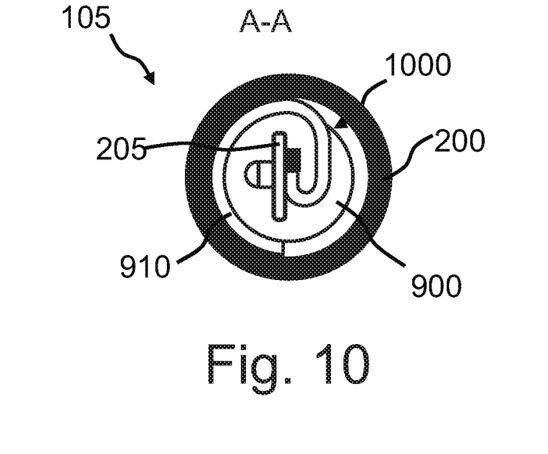
FIG. 10 shows a cross-sectional representation of an operator control apparatus according to an exemplary embodiment.

FIG. 10 shows a cross-sectional representation of an operator control apparatus 105 according to an exemplary embodiment. This can be the operator control apparatus 105 described in FIG. 9, which is shown in section along a sectional axis A-A. According to this exemplary embodiment, the film 910 connected to the electronics unit 205 extends into an interspace 1000 between a support outer wall of the support 900, which wall is circular in cross section, and a base body inner wall of the base body 200, which wall is circular in cross section. The film 910 encompasses at least half of the support 900 in the interspace 1000 according to this exemplary embodiment.

Figure 11:
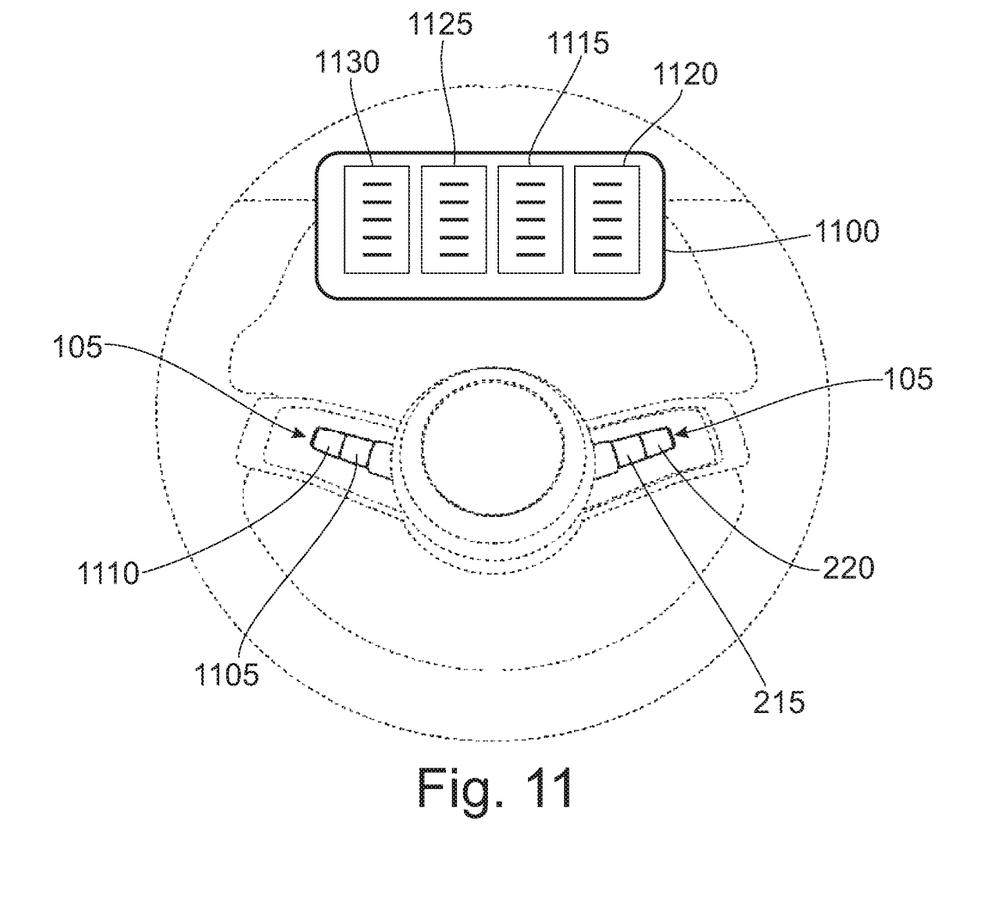
FIGS. 11 to 12 each show a schematic representation of an operator control apparatus according to an exemplary embodiment.

FIG. 11 shows a schematic representation of an operator control apparatus 105 according to an exemplary embodiment. This can be one of the operator control apparatuses 105 described on the basis of one of FIGS. 1 to 6 or 8 to 10. As described in FIG. 1, the operator control apparatus 105 according to this exemplary embodiment is arranged on the steering wheel in double implementation in the form of thumb barrels.

According to this exemplary embodiment, the operator control apparatus 105 is designed to output a display signal to a display apparatus 1100 of the vehicle, the display apparatus 1100 being designed to respond to the display signal by displaying at least one or all of the vehicle functions adjustable by means of the operator control sections 215, 220, 1105, 1110. According to one exemplary embodiment, the operator control apparatus 105 outputs the display signal during operation of the operator control apparatus 105. According to one exemplary embodiment, the operator control apparatus 105 outputs the display signal during operation of the operator control apparatus 105, said display signal being designed to bring about a display of all of the vehicle functions associated with the operator control sections 215, 220, 1105, 1110 on the display apparatus 1100.

According to an alternative exemplary embodiment, the operator control apparatus 105 responds to the first touch signal by outputting a first display signal, which is designed to bring about a first display 1115 of the vehicle function associated with the first operator control section 115 on the display apparatus 1100, and/or responds to the second touch signal by outputting a second display signal, which is designed to bring about a second display 1120 of the vehicle function associated with the second operator control section 220 on the display apparatus 1100.

According to this exemplary embodiment, the further operator control apparatus 105 comprises at least one further first operator control section 1105 and a further second operator control section 1110. According to this exemplary embodiment, the further operator control apparatus 105 is shaped and designed in accordance with the operator control apparatus 105. According to one exemplary embodiment, further vehicle functions that are adjustable by operating the further first operator control section 1105 and/or the further second operator control section 1110 are different than the vehicle functions that are adjustable by means of the operator control apparatus 105. According to one exemplary embodiment, the operator control apparatus 105 responds to a further first touch signal, which represents a manual touch of the further first operator control section 1105 or approach toward the further first operator control section 1105, by outputting a further first display signal designed to bring about a further first display 1125 of the further vehicle function associated with the further first operator control section 1105 on the display apparatus 1100. According to one exemplary embodiment, the operator control apparatus 105 responds to a further second touch signal, which represents a manual touch of the further second operator control section 1110 or approach toward the further second operator control section 1110, by outputting a further second display signal designed to bring about a further second display 1130 of the further vehicle function associated with the further second operator control section 1110 on the display apparatus 1100.

According to this exemplary embodiment, the first display 1115 and the second display 1120 and/or the further first display 1125 and the further second display 1130 are displayed in sections of the display apparatus 1100 that correspond to an arrangement of the operator control sections 215, 220, 1105, 1110 on the steering wheel.

According to one exemplary embodiment, the display apparatus 1100 is in the form of a driver display and/or is part of the operator control apparatus 105.

Figure 12:
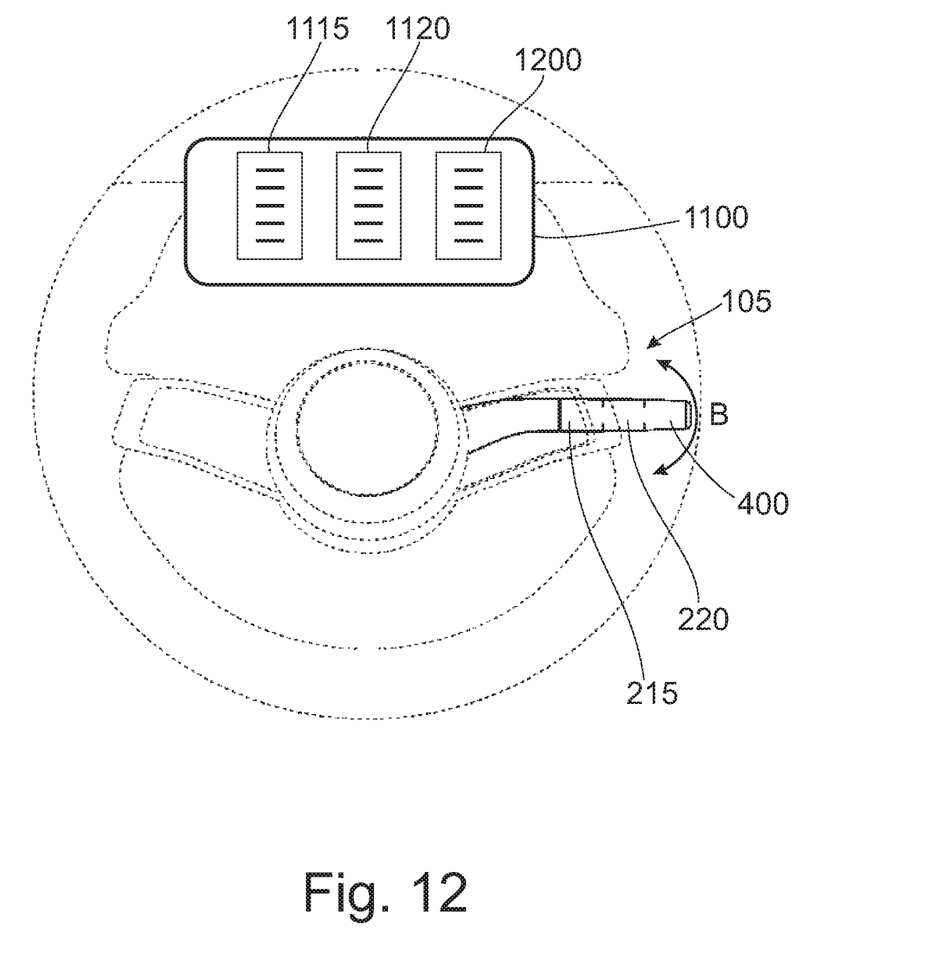

FIG. 12 shows a schematic representation of an operator control apparatus 105 according to an exemplary embodiment. This can be the operator control apparatus 105 described in FIG. 11, with the difference that the steering wheel comprises just one operator control apparatus 105, which is in the form of the tilting lever with three operator control sections 215, 220, 400 that is described in FIGS. 4 to 6.

According to this exemplary embodiment, the operator control apparatus 105 is designed to output the display signal to the display apparatus 1100 of the vehicle, the display apparatus 1100 being designed to respond to the display signal by displaying at least one or all of the vehicle functions adjustable by means of the operator control sections 215, 220, 400. According to one exemplary embodiment, the operator control apparatus 105 outputs the display signal during operation of the operator control apparatus 105, said display signal being designed to bring about a display of all of the vehicle functions associated with the operator control sections 215, 220, 400 on the display apparatus 1100.

According to an alternative exemplary embodiment, the operator control apparatus 105 responds to the first touch signal by outputting the first display signal, which is designed to bring about the first display 1115 of the vehicle function associated with the first operator control section 215 on the display apparatus 1100, and/or responds to the second touch signal by outputting the second display signal, which is designed to bring about the second display 1120 of the vehicle function associated with the second operator control section 220 on the display apparatus 1100, and/or responds to the third touch signal by outputting a third display signal, which is designed to bring about a third display 1200 of the vehicle function associated with the third operator control section 400 on the display apparatus 1100.

According to this exemplary embodiment, operating the first operator control section 215 allows an adjustment for an automatic cruise control, "ACC setting" for short, to be made. According to this exemplary embodiment, operating the second operator control section 220 allows a driving experience switch having at least the levels "Eco", "Comfort" and "Sport" to be adjusted. According to this exemplary embodiment, operating the third operator control section 400 allows a gear selection from the gears "P", "R", "N" and/or "D" to be made.

Figure 13:
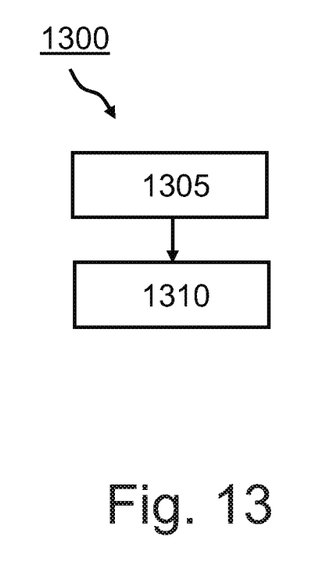
FIG. 13 shows a flowchart for a method for operating an operator control apparatus according to an exemplary embodiment.

FIG. 13 shows a flowchart for a method 1300 for operating an operator control apparatus according to an exemplary embodiment. This can be one of the operator control apparatuses 105 described on the basis of one of the preceding figures.

The method 1300 comprises a reading-in step 1305 and an adjusting step 1310. In reading-in step 1305, a first touch signal, which represents a manual touch of the first operator control section or approach toward the first operator control section of the operator control apparatus, or a second touch signal, which represents a manual touch of the second operator control section or approach toward the second operator control section of the operator control apparatus, is read in. In adjusting step 1310, the first rotation characteristic is adjusted using the first touch signal or the second rotation characteristic, which is different than the first rotation characteristic, is adjusted using the second touch signal.

If an exemplary embodiment comprises an "and/or" conjunction between a first feature and a second feature, this should be read to mean that the exemplary embodiment comprises both the first feature and the second feature according to one embodiment and comprises either only the first feature or only the second feature according to another embodiment.

REFERENCE SIGNS

A rotary movement
B tilt movement
100 vehicle
105 operator control apparatus
107 further operator control apparatus
110 steering wheel
200 base body
205 electronics unit
210 rotation unit
215 first operator control section
220 second operator control section
225 first touch signal
230 second touch signal
235 first rotation characteristic
240 second rotation characteristic
245 finger
248 actuator
250 rotation sensor
255 control device
260 first control signal
265 second control signal
400 third operator control section
800 fourth operator control section
805 fifth operator control section
810 sixth operator control section
815 seventh operator control section
820 eighth operator control section
825 ninth operator control section
830 retaining element
900 support
905 vehicle connector
910 film
915 base body support
920 actuator bracket
925 actuator controller
1000 interspace
1100 display apparatus
1105 further first operator control section
1110 further second operator control section
1115 first display
1120 second display
1125 further first display
1130 further second display
1200 third display
1300 method for operating an operator control apparatus
1305 reading-in step
1310 adjusting step

The invention claimed is:

1. An operator control apparatus for a vehicle, the operator control apparatus comprising:
a rotatable base body having a first operator control section for adjusting at least one first vehicle function of the vehicle and a second operator control section for adjusting a second vehicle function of the vehicle;
an electronics unit configured to generate a first touch signal, wherein the first touch signal represents at least one of a manual touch of and an approach towards the first operator control section, and the electronics unit configured to provide a second touch signal, wherein the second touch signal represents at least one of a manual touch of and an approach towards the second operator control section; and
a rotation unit for guiding a rotary movement of the rotatable base body, wherein the rotation unit is configured to respond to the first touch signal by adjusting a first rotation characteristic of the rotary movement and to respond to the second touch signal by adjusting a second rotation characteristic of the rotary movement, and wherein the second rotation characteristic is different than the first rotation characteristic.

2. The operator control apparatus of claim 1, wherein the base body is in at least one of a cylindrical form, a hollow form, and a tiltable form.

3. The operator control apparatus of claim 1, wherein the first operator control section and the second operator control section are rigidly connected to one another.

4. The operator control apparatus of claim 1, wherein the rotation unit comprises an MRF unit in order to produce at least one of the first rotation characteristic and the second rotation characteristic.

5. The operator control apparatus of claim 1, wherein the electronics unit is arranged in the base body and comprises a touch sensor system configured to sense the manual touch or approach of the first operator control section in order to initiate the first touch signal.

6. The operator control apparatus of claim 1, further comprising an association device configured to respond to an association signal by associating a fourth vehicle function with the first operator control section instead of the first vehicle function and/or by associating a fifth vehicle function with the second operator control section instead of the second vehicle function.

7. The operator control apparatus of claim 6, wherein the rotation unit is configured to use the association signal and the first touch signal to adjust a fourth rotation characteristic of the rotary movement and/or to use the association signal and the second touch signal to adjust a fifth rotation characteristic of the rotary movement.

8. The operator control apparatus of claim 1, wherein the rotation unit comprises a rotation sensor configured to sense the rotary movement and to initiate a rotation signal.

9. The operator control apparatus of claim 8, further comprising a control device configured to use the rotation signal and the first touch signal to output a first control signal for actuating at least the vehicle function associated with the first operator control section or to use the rotation signal and the second touch signal to output a second control signal for actuating at least the vehicle function associated with the second operator control section, wherein at least one of the vehicle functions comprises at least one at least one gear, a driving experience level, a comfort level, an infotainment setting, a lights setting, and a menu setting.

10. The operator control apparatus of claim 1, wherein the base body comprises at least one third operator control section for adjusting at least one third vehicle function of the vehicle, wherein the electronics unit is configured to generate a third touch signal that represents at least one of a manual touch of and an approach towards the third operator control section, wherein the rotation device is configured to respond to the third touch signal by adjusting a third rotation characteristic of the rotary movement.

11. At least one of a steering wheel, a dashboard, a center console, and an armrest for a vehicle having the operator control apparatus of claim 1.

12. A vehicle having the operator control apparatus of claim 1.

13. A method, comprising:
forming an operator control apparatus for a vehicle, the operator control apparatus comprising:
a rotatable base body having a first operator control section for adjusting at least one first vehicle function of the vehicle and a second operator control section for adjusting a second vehicle function of the vehicle;
an electronics unit configured to generate a first touch signal, wherein the first touch signal represents at least one of a manual touch of and an approach towards the first operator control section, and the electronics unit configured to provide a second touch signal, wherein the second touch signal represents at least one of a manual touch of and an approach towards the second operator control section; and
a rotation unit for guiding a rotary movement of the rotatable base body, wherein the rotation unit is configured to respond to the first touch signal by adjusting a first rotation characteristic of the rotary movement and to respond to the second touch signal by adjusting a second rotation characteristic of the rotary movement, and wherein the second rotation characteristic is different than the first rotation characteristic.

14. The method of claim 13, wherein the base body is in at least one of a cylindrical form, a hollow form, and a tiltable form.

15. The method of claim 13, wherein the first operator control section and the second operator control section are rigidly connected to one another.

16. The method of claim 13, wherein the rotation unit comprises an MRF unit in order to produce at least one of the first rotation characteristic and the second rotation characteristic.

17. The method of claim 13, wherein the electronics unit is arranged in the base body and comprises a touch sensor system configured to sense the manual touch or approach of the first operator control section in order to initiate the first touch signal.

18. The method of claim 13, wherein the operator control apparatus further comprises an association device configured to respond to an association signal by associating a fourth vehicle function with the first operator control section instead of the first vehicle function and/or by associating a fifth vehicle function with the second operator control section instead of the second vehicle function.

19. The method of claim 18, wherein the rotation unit is configured to use the association signal and the first touch signal to adjust a fourth rotation characteristic of the rotary movement and/or to use the association signal and the second touch signal to adjust a fifth rotation characteristic of the rotary movement.

* * * * *